(12) United States Patent
Magistri et al.

(10) Patent No.: US 9,160,603 B2
(45) Date of Patent: Oct. 13, 2015

(54) ADDITIVES AND METHODS FOR REDUCING HEXAVALENT CHROMIUM IN CEMENT

(75) Inventors: Matteo Magistri, Milan (IT); Potito D'Arcangelo, Milan (IT); Marco Squinzi, Milan (IT)

(73) Assignee: MAPEI S.P.A., Milan (IT)

( * ) Notice: Subject to any disclaimer, the term of this patent is extended or adjusted under 35 U.S.C. 154(b) by 700 days.

(21) Appl. No.: 12/446,868

(22) PCT Filed: Oct. 26, 2007

(86) PCT No.: PCT/IB2007/003235
§ 371 (c)(1),
(2), (4) Date: Mar. 15, 2010

(87) PCT Pub. No.: WO2008/053305
PCT Pub. Date: May 8, 2008

(65) Prior Publication Data
US 2010/0170420 A1    Jul. 8, 2010

(30) Foreign Application Priority Data
Nov. 2, 2006    (EP) .................................... 06022808

(51) Int. Cl.
| | | |
|---|---|---|
| C04B 22/00 | (2006.01) | |
| H04L 29/06 | (2006.01) | |
| C04B 28/02 | (2006.01) | |
| C04B 40/00 | (2006.01) | |
| C04B 103/52 | (2006.01) | |
| C04B 111/10 | (2006.01) | |

(52) U.S. Cl.
CPC .......... *H04L 29/06163* (2013.01); *C04B 28/02* (2013.01); *C04B 40/0039* (2013.01); *H04L 69/18* (2013.01); *C04B 2103/52* (2013.01); *C04B 2111/1081* (2013.01)

(58) Field of Classification Search
CPC ............ C04B 22/00; C04B 2111/1075; C04B 2111/1081; C04B 2103/0086

USPC ......................................... 106/713, 733, 734
See application file for complete search history.

(56) References Cited

U.S. PATENT DOCUMENTS

| | | | |
|---|---|---|---|
| 3,718,615 A * | 2/1973 | Woods et al. .............. | 106/18.13 |
| 2008/0092778 A1* | 4/2008 | Bauer et al. ................... | 106/419 |

FOREIGN PATENT DOCUMENTS

| | | | |
|---|---|---|---|
| EP | 1439154 A1 | | 7/2004 |
| EP | 1533287 A1 | | 5/2005 |
| EP | 1813583 | * | 8/2007 |
| EP | 1923370 A1 | | 5/2008 |
| ES | 2284371 | * | 1/2007 |
| JP | 6269764 A | | 9/1994 |
| JP | 2003170181 A | | 6/2003 |
| JP | 2003292351 A | | 10/2003 |
| JP | 2003292354 A | | 10/2003 |
| JP | 200451424 A | | 2/2004 |
| JP | 2004051424 A | | 2/2004 |
| SU | 1353793 A1 | | 11/1987 |

OTHER PUBLICATIONS

SU 1353793 (Nov. 23, 1987) Mustafaev et al. abstract only.*
ASTM Standard 0150: Standard Specification for Portland Cement—Annual Book of ASTM Standards, vol. 14.02.
ASTM Standard 0595: Standard Specification for Blended Hydraulic Cements—Annual Book of ASTM Standards, vol. 14.04.
Taylor, H.F.W "Composite cements." Cement Chemistry, Academic Press Ltd., (ISBN 0-12-683900-X), 1990. 276-279.
Morganville-Regourd, Micheline. "Cements Made From Blastfurnace Slag." Lea's Chemistry of Cement and Concrete. Ed P.C. Hewlett. 4th Ed. (ISBN 0 340 56589 6), 1998. 633-635.
Dodson, Vance H. "Granulated Blast Furnace Slag." Concrete Admixtures. Van Nostrand Reinhold, NY (ISBN 0-442-00149-5), 1990. 165-167.

* cited by examiner

*Primary Examiner* — Paul Marcantoni
(74) *Attorney, Agent, or Firm* — Silvia Salvadori, P.C.

(57) ABSTRACT

A method for reducing hexavalent chromium in cement comprising the addition, to said cement, of antimony(III) compounds as reducing agents.

10 Claims, No Drawings

ADDITIVES AND METHODS FOR REDUCING HEXAVALENT CHROMIUM IN CEMENT

CROSS REFERENCE TO RELATED APPLICATION

This is a National Stage of International Application PCT/IB2007/003235, filed 26 Oct. 2007, which claims the benefit of Application Ser. No. 06/022,808.7, filed in Europe on 2 Nov. 2006, the disclosures of which Applications are incorporated by reference herein.

FIELD OF THE INVENTION

This invention relates to a method for reducing hexavalent chromium released into water solution from cement. This method consists in the use of antimony(III) compounds directly added to cement before, during or after grinding. The efficacy of the method relies on the fact that the antimony(III) is a strong reducing agent in alkaline solution and can effectively reduce chromium(VI) to less toxic and less soluble chromium(III). The antimony(III) compounds can be either in form of powder or in form of an additive formulation in liquid form, comprising an antimony(III) salt, optionally a chelating agent and/or an antioxidant, oxygen scavenger or mixture thereof, and/or optionally a cement grinding aid, cement performance improver, or mixture thereof. The antimony(III) compounds can also be dispersed in form of solid particles in a liquid carrier.

BACKGROUND OF INVENTION

The raw material for cement clinker manufacturing can contain chromium. Due to the highly oxidizing and alkaline conditions of the kiln, during clinker production it is partially converted to toxic hexavalent chromium. As a result, the Portland clinkers and cements obtained by clinker grinding contain soluble chromates (usually in the range of 1-100 ppm or mg/kg, while the total chromium can reach the 500 ppm) that are released when cement comes into contact with water and are reported to cause skin irritation (allergic contact dermatitis). This is the reason why the European Community has recently introduced the obligation (Directive 2003/53/EC) to maintain the level of soluble chromates below 2 ppm (mg/kg) [see for example http://eur-lex.europa.eu/LexUriServ/site/en/oj/2003/l_178/l_17820030717en00240027.pdf].

Several reducing agents have been disclosed: see for example WO 2006061127, EP 1559694, EP 1533287, WO 2005090258, US 2005072339, WO 2005076858, EP 1505045, EP 960865, EP 697380, DE 10014468, FR 2858612, AU 647118, JP 2002274907, JP 11092193, CN 1299788.

The elimination of soluble hexavalent chromium is currently mainly obtained with the use of Iron(II) sulphate or Tin(II) sulphate or chloride (either in powder or in form of liquid additive) added during cement grinding or storage. Cr(VI) is electrochemically reduced to Cr(III) that is less toxic and anyway tends to precipitate in the alkaline conditions commonly found during the hydration of cement.

The use of Iron(II) salts is however not efficient, due to the fact that they are readily oxidized to Iron(III) after contact with air and moisture, particularly at high temperature (above 60° C.). The required amount of Iron(II) needed for the reduction of hexavalent chromium is then usually several times higher than stoichiometric, and after a prolonged contact with air (e.g. during storage) the reducing effect is lost. For the same reason, the use of Iron(II) compounds in water solution is not useful. Iron(III) produced from oxidation of Iron(II) is also reported to cause spots on the surface of cement and Iron(II) sulphate at high dosages can cause an extended setting time in cementitious systems.

The use of stannous salts allows to obtain better performances: the dosages are close to stoichiometric and the reducing effect is higher and longer-lasting in comparison to Iron(II). The oxidation products of Tin(II) do not cause spots on concrete surface. The reducing properties of Tin(II) in alkaline conditions are based on the formation of stannous hydroxide $Sn(OH)_2$ that has a red-ox potential E=−0.96 volt at pH=13 [Handbook of Chemistry and Physics, CRC Press, $83^{rd}$ edition, 2002-2003]. As soon as the cement is mixed with water, the pH rises and Tin(II) becomes a strong reducing agent that immediately eliminates soluble chromates.

If the formation of stannous hydroxide occurs when the hexavalent chromium is not yet available for reduction (e.g. during grinding or storage of cement or in general before mixing cement with water), Tin(II) is oxidized by air due to his low red-ox potential. Even in absence of air, stannous hydroxide tends to dismutate to Tin(0) and Tin(IV), being deactivated [A. Aràneo, Chimica analitica qualitativa, CEA, $3^{rd}$ edition]. Stannous salts have acid properties and in presence of traces of water they can react with the very alkaline lime giving stannous hydroxide, according to the following reactions:

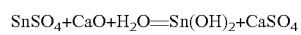

$$SnSO_4 + CaO + H_2O = Sn(OH)_2 + CaSO_4 \qquad 1$$

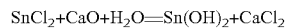

$$SnCl_2 + CaO + H_2O = Sn(OH)_2 + CaCl_2 \qquad 2$$

This is the reason why the stannous salts are not profitable when they are used in grinding of clinker with high amount of free lime: stannous hydroxide can be formed and quickly oxidized to Tin(IV) and the amount of Tin(II) must be increased in order to obtain the elimination of soluble chromates [see for details: "Stannous sulphate: research study" in World Cement, February 2007 issue].

The tendency to react with CaO in presence of water should be higher for stannous sulphate, thanks to the formation of the poor soluble calcium sulphate that shifts the reaction 1. This is probably the reason why stannous sulphate is less effective in solution (that means presence of water) than stannous chloride, as reported in 2005/0166801 A1 and in the example of the present patent. In the case of a clinker with a high content of free lime the results obtained either with stannous chloride or sulphate are not completely satisfactory (see Table). In particular the Tin(II) sulphate solution is less efficient than Tin(II) chloride solution.

In JP2003292351, EP1439154A1 and JP2004051424 a cement admixture capable of eliminating hexavalent chromium is disclosed. Said cement admixture basically comprises a slowly cooled blast furnace slag and the elimination of hexavalent chromium is obtained by electrochemical reduction (the reducing agent is a sulphur compound in non-sulfuric or non-sulphate form) or by suppressing the elution of soluble chromates (using conventionally known hazardous heavy metals immobilizing agents such as bentonites, zeolites or antimonates). Even though said admixtures is effective for use in concrete, the requirement of a high content of slowly cooled slag and the high dosages proposed (most preferably from 10 to 40 parts, in 100 parts of cement composition) lead to the disadvantage that it cannot be used for hexavalent chromium reduction in common cements. As a matter of fact, according to well known international standards (see for example the European Standard UNI EN 197-1: "Composition, specifications and conformity criteria for common cements") common cements cannot contain such type of slowly cooled slag in the amount proposed in the cited patents. In particular, the characteristics of such slowly cooled blast furnace slag do not comply with the requirement for blast furnace slag commonly used in cements, as described in the EN 197-1.

In view of the disadvantages of the known reducing or immobilizing agents, there exists a need for a novel hexavalent chromium reducer, which can be used in cement grinding especially (but not limited to) in the case of clinker with a high content of free lime.

SUMMARY OF THE INVENTION

The invention provides a method for reducing hexavalent chromium in cement comprising the addition of antimony (III) compounds to said cement. In a further embodiment, the invention provides a cement additive comprising an antimony (III) compound admixture with suitable carriers and/or adjuvants, for use in reducing hexavalent chromium in cement.

In still a further embodiment, the invention also refers to a cement composition obtainable by said method and substantially free from hexavalent chromium.

DETAILED DESCRIPTION OF THE INVENTION

It has been found that the prior art disadvantages may be overcome by using antimony (III) compounds such as antimony (III) oxide, inorganic salts, coordination compounds (e.g. antimony (III) chelate with a ligand), organometallic compounds of antimony (III) or a mixture thereof. Each antimony(III) compound can be added to cement in powder and/or in a liquid additive form, e.g. solubilized, dispersed and/or suspended in water or in an organic solvent.

It has in fact been found that antimony (III) is a reducing agent in alkaline conditions, as demonstrated by the red-ox potential for the following reaction [Handbook of Chemistry and Physics, CRC Press, 83rd edition, 2002-2003]:

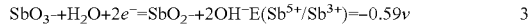

$$SbO_3^- + H_2O + 2e^- = SbO_2^- + 2OH^- \quad E(Sb^{5+}/Sb^{3+}) = -0.59v \quad 3$$

It has also been found that antimony (III) is not affected by the free CaO content of clinker, as reported later in the example. As a matter of fact, the use of antimony (III) compounds for the reduction of hexavalent chromium in cement is advantageous, especially in comparison with the iron or stannous salts used until now. With reference to JP2003292351A, EP1439154A1 and JP2004051424A, the use of antimony (III) compounds as reducing agent is both innovative (because in the cited documents the elimination of hexavalent chromium is clearly obtained making use of the reducing properties of sulphur, or by physical immobilization in bentonites, zeolites or antimonates, with no references to the red-ox properties of antimony(III) compounds) and advantageous (thanks to the absence of slowly cooled slag, the present invention can be used with no limitations in common cements).

The method of the invention thus comprises the introduction to cement before, during or after grinding of clinker and gypsum and/or other additives (e.g. in a ball or roller mill), of an antimony(III) compound, in one of the following forms, or a mixture thereof:
  antimony (III) oxide and/or an antimony(III) inorganic salt;
  an antimony (III) chelate with an inorganic or organic ligand;
  an antimony (III) organometallic compound.

Alternatively, the method of the invention comprises the introduction to cement, before, during or after grinding of clinker and gypsum and/or other additives (e.g. in a ball or roller mill), of a liquid additive comprising an antimony (III) compound, in one of the form reported above, or a mixture thereof. The liquid additive can contain other components such as antioxidants and/or oxygen scavengers, optionally with a grinding aid and/or cement performance enhancer. The liquid carrier of the additive is water or an organic solvent (e.g. ethylene or propylene glycols, glycerine, alcohols) or mixtures thereof.

The introduction to cement may be carried out before, during or after grinding of clinker and gypsum and/or other additives (e.g. in a ball or roller mill), of a suspension or dispersion of solid particles in a liquid carrier. The solid particles can be of one of the antimony (III) compounds reported above, or a mixture thereof. The dispersion or suspension usually comprises a viscosity modifying agent and may comprise antioxidants, oxygen scavengers, grinding aids and/or a cement performance enhancers or mixtures thereof. The liquid carrier of the suspension is water or an organic solvent (e.g. ethylene or propylene glycols, glycerine, alcohols) or mixtures thereof.

The antimony (III) compound is preferably selected from:
  antimony(III) oxide.
  an antimony(III) inorganic salt, such as, but not limited to, chloride, fluoride, carbonate, sulphate, hydroxide, bromide, iodide, acetate, phosphate.
  an antimony(III) chelate compound, where the chelation can be obtained with an inorganic or organic ligand such as, but not limited to, fluoride, chloride, carbonate, tartrate, ossalate, citrate, lactate, glycolate, acetate, salts of ethylenediaminotetraacetic acid, ethylene or propylene glycols, glycerine, alkanolamines.
  an antimony(III) organometallic compound.

The antimony (III) compound is added to cement in order to have an amount of antimony of 0.0008% to 0.08% for each ppm of Cr(VI) to be reduced. The percent are expressed as mass of antimony over mass of cement. For example, if the antimony (III) compound used is antimony potassium tartrate $Sb_2K_2C_8H_4O_{12} \cdot 3H_2O$ (an antimony chelate compound where the ligand is the tartrate and antimony is the 36.5% of the total mass), it can be added to the cement in order to have an amount of 0.0022% to 0.22% for each ppm of Cr(VI) to be reduced.

The antimony (III) compound may be solubilized in a liquid carrier. The amount of antimony (III) compound may be from 1 to 95% (depending on its solubility in the liquid carrier) on total weight of the liquid additive. The liquid additive is added to cement in order to have an amount of antimony of 0.0008% to 0.08% for each ppm of Cr(VI) to be reduced. The percent are expressed in mass of antimony over mass of cement. For example, if the liquid additive is a 10% aqueous solution (on the total weight of the liquid additive) of antimony(III) sodium citrate $Na[Sb(C_6H_6O_7)_2]$, it can be added to cement in order to have an amount of 0.035% to 3.5% for each ppm of Cr(VI) to be reduced. The liquid carrier is preferably water or an organic solvent (e.g. ethylene or propylene glycols, glycerine, alcohols) or mixtures thereof. In comparison with powder form, the use of a liquid carrier may be advantageous in term of environmental health and safety, eliminating the inhalation risks.

The invention also provides a possible oxidation of antimony (III). This is the reason why the above mentioned liquid additive can contain, together with the antimony (III) compound, other components such as antioxidant or oxygen scavengers. The term "antioxidant" refers to compositions, materials or compounds which decreases the rate of oxidation or otherwise reduces the undesirable effects of oxidation upon the Cr (VI) reducing agent herein described.

Several antioxidants may be employed according to the invention. These include but are not limited to:
- 2,6-di(t-butyl)-4-methylphenol (BHT);
- 2,2'-methylene-bis(6-t-butyl-p-cresol);
- Triphenylphosphite;
- Tris-(nonylphenyl)phosphate;
- Dilaurylthiodipropionate;
- Sulphur dioxide;
- Butyrophenone;
- Butylated hydroxy anisole.

The term "oxygen scavenger" refers to compositions, materials or compounds which can remove oxygen, for instance by reacting or combining with entrapped oxygen, or by catalyzing an oxidation reaction yielding innocuous products.

Several antioxidants may be employed in the present invention. These include but are not limited to:
- Compounds containing an ethylenically unsaturated hydrocarbon: diene polymer such as polyisoprene, polybutadiene and copolymers thereof (styrene-butadiene);
- A phenolic or salt or derivative thereof: hydroquinone, pyrocatechol and derivates thereof;
- Hydroxylamine or hydrazine or derivative thereof;
- Sulphurous acid or salt derivative thereof: sulfite, bisulfite and thiosulfate;
- A transition metal complex.

When the additive is in liquid form, it may optionally contain other components such as grinding aids or cement performance enhancers or mixtures thereof.

The additive may be in form of a suspension of solid particles in a liquid carrier. The solid particles can be of one of the antimony (III) compounds reported above, or mixtures thereof. A solid dispersion allows to obtain an increase of the active phase in case of antimony (III) compounds poorly soluble in the liquid carrier. In comparison with powder form, the use of a liquid carrier allows to achieve a greater advantages in term of environmental health and safety, eliminating the human inhalation risks. This suspension can be added to cement in order to have an amount of antimony of 0.0008% to 0.08% for each ppm of Cr(VI) to be reduced. The percent are expressed in mass of antimony over mass of cement. For example, if the suspension is made by suspending in water solid particles of antimony potassium tartrate $Sb_2K_2C_8H_4O_{12}.3H_2O$ and if the amount of said antimony (III) compound is 36% (on the total weight of the suspension), the suspension can be added to cement in order to have an amount of 0.006% to 0.61% for each ppm of Cr(VI) to be reduced. The liquid carrier may be water or an organic solvent (e.g. ethylene or propylene glycols, glycerine, alcohols) or a mixture thereof.

The suspensions may optionally contain a viscosity modifying agent (VMA) such as:
- Biopolymer polysaccharides selected from the group consisting of welan gum, diutan gum, xanthan, rhamsan, gellan, dextran, pullulan, curdlan and derivatives thereof;
- Marine gums selected from the group consisting of algin, agar, carrageenan, and derivatives thereof;
- Plant exudates selected from the group consisting of locust bean, okra, psyllium, mesquite, and derivatives thereof;
- Starch-based gums selected from the group consisting of ethers, esters, and derivatives thereof;
- Associative thickeners selected from the group consisting of hydrophobically modified alkali swellable acrylic copolymer, hydrophobically modified urethane copolymers, associative thickeners based on polyurethanes, cellulose (e.g. hydroxyethyl cellulose, carboxymethyl-hydroxyethylcellulose), polyacrylates and polyethers.

Other examples of liquid carriers for suspending antimony (III) salts include alkanolamines, glycols, alcohols, glycerols or mixtures thereof.

For example, a suspension is made by suspending in water solid particles of antimony (III) oxide ($Sb_2O_3$). The viscosity of water is modified by using a xanthan gum based VMA. If the amount of said antimony (III) compound is 20% (on the total weight of the suspension), the suspension can be added to cement in order to have an amount of 0.0048% to 0.48% for each ppm of Cr(VI) to be reduced.

The suspensions may optionally contain, together with the antimony (III) compound, other components such as the above mentioned antioxidant and/or oxygen scavengers grinding aids or cement performance enhancers or mixtures thereof.

The invention is illustrated in more detail in the following Example.

EXAMPLE

An antimony(III) compound composition was formulated by mixing together antimony(III) potassium tartrate powder and a xanthan gum based VMA. Both products are dispersed in water. A phenolic oxygen scavenger allows to decrease the antimony (III) oxidation.

This invention was compared to different kinds of chromium reducing agents commonly employed in cement factories: Iron(II) sulphate powder, Tin(II) sulphate suspension, Tin(II) sulphate solution and Tin(II) chloride solution.

In this trial, a clinker with an high free lime content (about 1.8%) was ground with 5% of gypsum in a lab ball mill. Four cement grindings were performed: the first one without any additive in order to check the Cr(VI) content of the cement, the others adding the three chromium reducing agents. The amount of soluble hexavalent chromium was checked according to the European Standard Test Method PrEN 196-10 and confirmed by ionic chromatography [see for details "Determination of soluble chròmates in cement and cement based materials by ion chromatography", Zement Kalk Gips International, n° 7/2005, Vol. 58, p. 55].

The dosages used are the following:
- Antimony(III) tartrate 36% suspension: 0.0065% on the weight of the clinker for each ppm of Cr(VI) to be reduced;
- $SnSO_4$ 50% suspension: 0.003% on the weight of the clinker for each ppm of Cr(VI) to be reduced;
- $SnCl_2$ 50% solution: 0.003% on the weight of the clinker for each ppm of Cr(VI) to be reduced;
- $SnSO_4$ 20% solution: 0.0075% on the weight of the clinker for each ppm of Cr(VI) to be reduced;
- $FeSO_4.7H_2O$ powder: 0.020% on the weight of the clinker for each ppm of Cr(VI) to be reduced.

The results obtained by all additives are described in Table.

TABLE efficacy of antimony (III) compounds and Tin (II)/Iron (II) salts on clinker with high free lime content (CaO = 1.8%)

| Chromate reducing additive | Form | Active phase Content (%) | Dosage (%) | Cr (VI) amount (ppm) |
|---|---|---|---|---|
| None | — | — | — | 10.0 |
| Sb (III) compound | Dispersion | 36 | 0.065 | 0.1 |
| Sn (II) sulphate | Dispersion | 50 | 0.030 | 6.0 |
| Sn (II) chloride | Solution | 50 | 0.030 | 7.3 |

TABLE-continued efficacy of antimony (III) compounds and Tin (II)/Iron (II) salts on clinker with high free lime content (CaO = 1.8%)

| Chromate reducing additive | Form | Active phase Content (%) | Dosage (%) | Cr (VI) amount (ppm) |
|---|---|---|---|---|
| Sn (II) sulphate | Solution | 20 | 0.075 | 9.0 |
| Fe (II) sulphate | Powder | 100 | 0.200 | 7.0 |

In presence of an high content of free lime, it can be easily observed that:
- the additives based on Tin(II) e Iron(II) salts have unsatisfactory performances;
- the additive based on antimony (III) compound shows the best results, reducing all the Cr(VI).

The invention claimed is:

1. A method for reducing hexavalent chromium in Portland cements and hydraulic blended cements, said method consisting essentially of adding an antimony(III) compound as reducing agent to said Portland cements and hydraulic blended cements, said antimony(III) compound being added in water, and said antimony(III) compound being selected from the group consisting essentially of an antimony(III) oxide, an antimony(III) inorganic salt, an antimony(III) chelate compound, and an antimony(III) organometallic compound.

2. The method according to claim 1 wherein the antimony (III) inorganic salt is selected from the group consisting of chloride, fluoride, carbonate, sulphate, hydroxide, sulphite, thiosulphate, nitrate, nitrite, thiocyanate, formiate, bromide, iodide, acetate, and phosphate salt.

3. The method according to claim 1 wherein the antimony (III) compound is the antimony(III) chelate compound wherein chelation is obtained with an inorganic or organic ligand selected from the group consisting of fluoride, chloride, sulphide, carbonate, hydroxide, tartrate, ossalate, citrate, lactate, glycolate, acetate, salts of ethylenediaminotetraacetic acid, ethylene or propylene glycols, glycerin, alkanolamines, polycarboxylic acid, hydroxycarboxylic acids, and aminoacids or mixture thereof.

4. The method according to claim 1, wherein the antimony (III) compound is added in liquid form.

5. A method according to claim 1, wherein the antimony (III) compound is added in form of powder.

6. The method according to claim 1, wherein the antimony (III) compound is added in form of suspension of solid particles in a liquid carrier.

7. A method for reducing hexavalent chromium in Portland cements and hydraulic blended cements, said method consisting essentially of adding an antimony(III) compound as reducing agent in form of suspension of solid particles in water together with a viscosity modifying agent to said Portland cements and hydraulic blended cements, said antimony (III) compound being selected from the group consisting essentially of an antimony(III) oxide, an antimony(III) inorganic salt, an antimony(III) chelate compound, and an antimony(III) organometallic compound.

8. The method according to claim 1, wherein the antimony (III) compound is added before, during or after grinding clinker and gypsum and/or other additives.

9. The method according to claim 1, wherein said antimony (III) compound is added to cement clinker in percentages in order to have an amount of antimony from 0.0008% to 0.08% by weight of cement for each ppm of Cr(IV) to be reduced.

10. A method for reducing hexavalent chromium in Portland cements and hydraulic blended cements, said method consisting essentially of adding an antimony(III) compound as reducing agent together with antioxidants, radical scavengers, grinding aids, cement performance enhancers or mixtures thereof to said Portland cements and hydraulic blended cements, said antimony(III) compound being added in water and said antimony(III) compound being selected from the group consisting essentially of an antimony(III) oxide, an antimony(III) inorganic salt, an antimony(III) chelate compound, and an antimony(III) organometallic compound.

* * * * *